Dec. 23, 1969   H. D. HENDRICKSON   3,485,260
FLUID DRAINAGE
Filed June 14, 1967
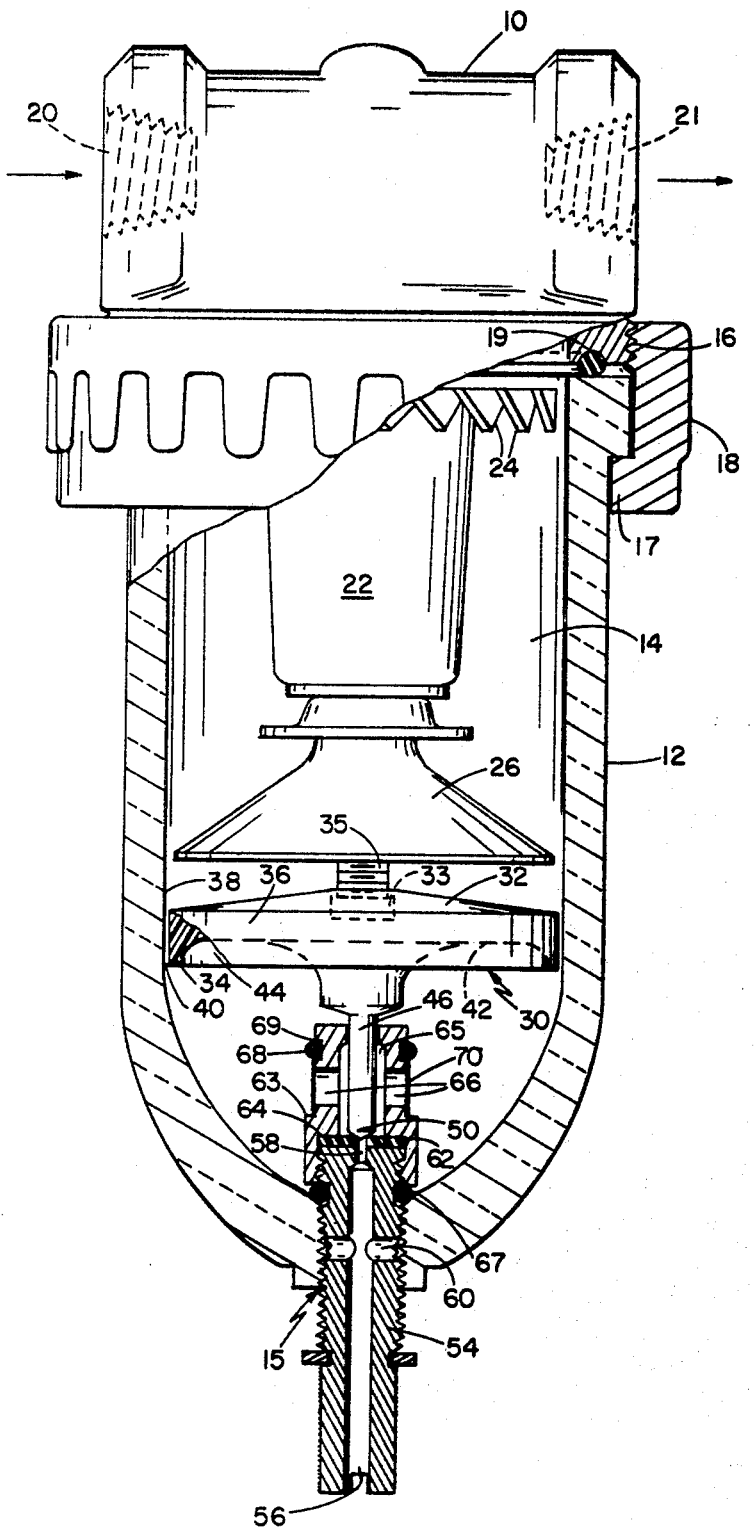

United States Patent Office 3,485,260
Patented Dec. 23, 1969

3,485,260
FLUID DRAINAGE
Howard Doerle Hendrickson, Topsfield, Mass., assignor to Watts Regulator Co., Lawrence, Mass., a corporation of Massachusetts
Filed June 14, 1967, Ser. No. 646,047
Int. Cl. F16t *1/30;* B01d *45/16*
U.S. Cl. 137—204           5 Claims

ABSTRACT OF THE DISCLOSURE

Liquid drainage device in which a piston extends across a chamber between the inlet and the outlet to define a reservoir adjacent the outlet communicating through a restricted zone (preferably an annular gap from 0.003 to 0.006 inch wide) with the chamber volume adjacent the inlet, and a valve member is operatively carried by the piston to open and close the outlet.

---

This invention relates to liquid drainage.

Objects of the invention are to provide a device responsive to a pressure differential to automatically drain liquid collected in a reservoir, that is simple; inexpensive; reliable; easily adapted to existing fluid systems; operable (e.g., in a compressed air line filter and water separator) over a wide range of pressures, flow rates, and water concentrations without interferring with the pneumatic system; and capable of operating so that drainage occurs only upon the presence of liquid requiring draining.

The invention features a chamber having a fluid inlet and a drain outlet, a piston extending across the chamber between the inlet and outlet to define a liquid reservoir adjacent the outlet and a restricted fluid flow zone between the reservoir and the chamber volume adjacent the inlet, the piston being movable toward and away from the outlet and having oppositely directed surfaces respectively operatively exposed to fluid pressure in the reservoir and in the chamber volume adjacent the inlet, and a valve member operatively carried by the piston between positions respectively opening and closing the outlet. In preferred embodiments the restricted flow zone is an annular gap from 0.003 to 0.006 inch wide, between the piston and the adjacent interior surface of the chamber; the valve member is a shaft integral with the piston and extending from the piston through a guide toward a valve seat in the outlet, the end of the shaft being shaped to mate with the seat to close the outlet; the piston has a recess at its surface operatively exposed to fluid pressure in the reservoir and a skirt surrounding the recess adjacent the gap; and the device, used in a compressed air line, is provided on the inlet side of the piston with a second outlet for air introduced through the inlet with water vapor which is centrifugally separated from the air in the chamber and collected in the reservoir, and a filter in the flow path between the inlet and the air outlet.

Other objects, features, and advantages of the invention will appear in the following description of a preferred embodiment thereof, taken together with the drawing showing partially in section a filter and water separator device according to the invention.

Head 10 and depending transparent polycarbonate plastic bowl 12 held together with sealing O-ring 19 therebetween by threads 16 and flange 17 of annular member 18, define chamber 14 having liquid outlet 15 at the bottom of the bowl. Air inlet 20 and air outlet 21 communicate with chamber 14 (the latter through filter 22). Fins 24 divert entering air into centrifugal motion and baffle 26 shields the lower part of the chamber from the resulting turbulence.

Piston 30 (of the material sold by General Electric Co. under the trade designation Noryl) has slightly conical convex surface 32 directed toward the bottom of baffle 26 with recess 33 to receive protruding central baffle support 35. Skirt 34 has smooth cylindrical surface 36 (of 1.8 inches diameter and 0.28 inch high) spaced from the inner surface 38 of bowl 12 by a 0.005 inch gap 40 (the preferred range is .003–.006 inch), and extends 0.15 inch below bottom surface 42 of the piston to define recess 44. Shaft 46, integral with the piston, extends toward outlet 25 and has at its bottom conical tip 50.

Draincock 54 is threaded in outlet 15 and has axial passage 56 with reduced upper portion 58, and transverse passage 60. Rubber washer 62 on top of draincock 54 provides a valve seat for tip 50. Guide 63 screws over the top of draincock 54 and has a shoulder 64 to hold washed 62 in place, a central opening 64 for shaft 46, and transverse liquid passages 66. Rubber O-ring 67 seals between the draincock assembly and bowl 12. O-ring 68 fits in groove 69 of guide 63 and holds down strainer 70 surrounding guide 63 at passages 66.

In operation, with inlet 20 and outlet 21 connected in a compressed air line (not shown), air whirls inside bowl 12 above baffle 26 and eventually passes through filter 22 and outlet 21. Water separated from the air passes through gap 40 and collects at the bottom of bowl 12 which acts as a reservoir. With tip 50 seated in washer 62 outlet 15 is closed. Outlet 15 remains closed when the air line is closed downstream of outlet 21. If any water has passed through the system, some of it will be trapped in gap 40 to provide a temporary seal. Upon reopening of the line, the transient pressure drop in chamber 14 will be delayed in propagating below piston 30 due to the water bridging gap 40, so that a resulting pressure differential across the piston will raise it (with baffle 26 acting as a stop to prevent shaft 46 from leaving guide 63), opening outlet 15. Line pressure will eject the water from bowl 12 through strainer 70, passages 66 and passage 56 before pressure equilization returns the piston to close the outlet.

Should so much water ever collect in bowl 12 so that piston 30 becomes submerged, air will be trapped in recess 44 so that the piston will still operate as just described.

When desired, draincock 54 may be rotated to raise passage 60 into chamber 14 to manually drain collected water.

Other embodiments will occur to those skilled in the art and are within the following claims.

What is claimed is:

1. A drainage device for separating the liquid component from a liquid-gaseous, fluid mixture in response to the presence of said liquid component comprising, in combination:
    a chamber having a fluid inlet and a drain outlet,
    a substantially rigid piston extending across said chamber between said inlet and said outlet to define a liquid reservoir adjacent said outlet and a volume of said chamber adjacent inlet, said piston being dimensioned with respect to the interior surface of said chamber to define a restricted fluid flow zone between said reservoir and the volume of said chamber adjacent said inlet, said piston being movable toward and away from said outlet and having oppositely directed surfaces respectively operatively exposed to fluid pressure in said reservoir and said volume,
    said gap being dimensioned to enable gas to flow through said gap in response to a pressure differential across said piston so as to preclude said pressure differential from imparting movement to said piston, said gap being adapted to receive and retain liquid therein, said retained liquid being effective to seal said gap and to preclude gaseous flow therethrough whereby when said liquid is present within said gap a pressure differential across said piston will draw said piston away from said outlet, and a valve member operatively carried by said piston for movement in unison therewith toward and away from said outlet between positions respectively opening and closing said outlet in response to the presence of said liquid within said gap.

2. The device of claim 1 wherein said gap is annular.

3. The device of claim 2 wherein the width of said gap is 0.003–0.006 inch.

4. The device of claim 1 wherein said piston has a recess at its said surface operatively exposed to fluid pressure in said reservoir, and a skirt surrounding said recess adjacent said gap.

5. The device of claim 1 including a draincock having a first passage arranged to cooperate with said valve to open and close said outlet, and a second passage for manual drainage, said draincock having first and second positions in which said second passage is respectively in and out of communication with said reservoir.

References Cited
UNITED STATES PATENTS

| | | | |
|---|---|---|---|
| 722,837 | 3/1903 | Guillemet | 137—204 |
| 2,537,224 | 1/1951 | Lansdale et al. | 137—204 |
| 2,662,544 | 12/1953 | Hall | 137—204 |
| 2,692,026 | 10/1954 | Frantz | 55—218 |
| 2,924,237 | 2/1960 | Ellis | 137—599.2 |
| 3,093,467 | 6/1963 | McLaughlin | 55—218 |
| 3,261,146 | 7/1966 | Malec | 137—204 XR |

ROBERT G. NILSON, Primary Examiner

U.S. Cl. X.R.

55—218, 137, 599.2